United States Patent [19]

Szatkowski et al.

[11] Patent Number: 4,737,272
[45] Date of Patent: Apr. 12, 1988

[54] FROTH FLOTATION METHOD AND APPARATUS

[75] Inventors: Marian Szatkowski, Hancock; Wilfred L. Freyberger, Houghton, both of Mich.

[73] Assignee: Baker International Corporation, Houston, Tex.

[21] Appl. No.: 850,806

[22] Filed: Apr. 11, 1986

[51] Int. Cl.$^4$ .......................... B03D 1/02; B03D 1/14; B03B 13/00
[52] U.S. Cl. .................................... 209/164; 209/170; 209/1; 210/221.2; 210/709; 210/703
[58] Field of Search ............... 209/164, 168, 169, 170, 209/1; 261/87.93, 121 R; 210/221.1, 221.2, 703, 704, 708, 709, 738, 804

[56] References Cited

U.S. PATENT DOCUMENTS

| | | | |
|---|---|---|---|
| 2,088,624 | 8/1937 | Tschudy | 209/164 |
| 2,713,477 | 7/1955 | Daman | 209/168 X |
| 3,339,730 | 9/1967 | Boutin et al. | 209/168 |
| 3,491,880 | 1/1970 | Reck | 209/164 |
| 4,133,746 | 1/1979 | Dopson | 209/164 X |
| 4,490,248 | 12/1984 | Filippov et al. | 209/164 |
| 4,592,834 | 6/1986 | Yang | 209/166 |

*Primary Examiner*—S. Leon Bashore
*Assistant Examiner*—Andrew J. Anderson
*Attorney, Agent, or Firm*—Carl A. Rowold

[57] ABSTRACT

A method for improving separation of the flotable phase from the non-flotable phase of a slurry of particulate material in a froth flotation machine comprising a tank, an upper outlet port for discharge of the flotable phase, and a mechanism for delivering air to the slurry in the tank to form a froth which includes a mixture of air bubbles and the flotable phase from the slurry, with the rate and selectivity of separation of the flotable phase from the slurry for predetermined size particles of the flotable phase and at a predetermined concentration of the flotable phase being dependent on the total volume and size distribution of the air bubbles generated in the slurry, the method of this invention comprising the steps of providing a quantity of slurry in the tank, generating air bubbles of relatively small size and relatively large size, and controlling the volume of air as small bubbles and the volume of air as large bubbles in response to the concentration of the flotable phase of the slurry for enhanced separation of the flotable phase from the slurry. A method for improved froth flotation separation of the phases of a multi-phase liquid, and improved single-cell and multiple cell froth flotation machines operating in accordance with the methods of this invention are also disclosed.

44 Claims, 8 Drawing Sheets

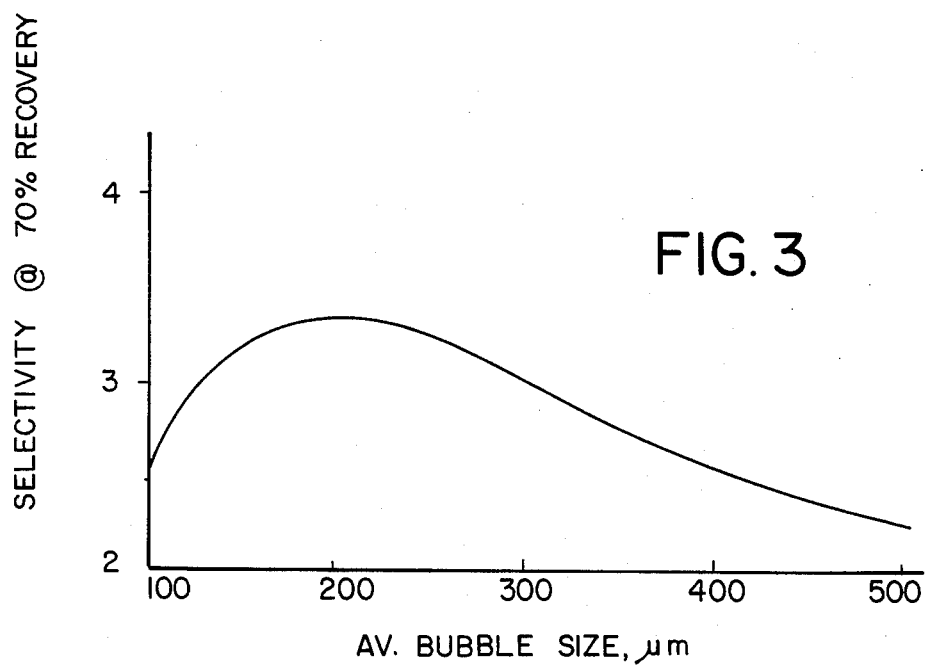
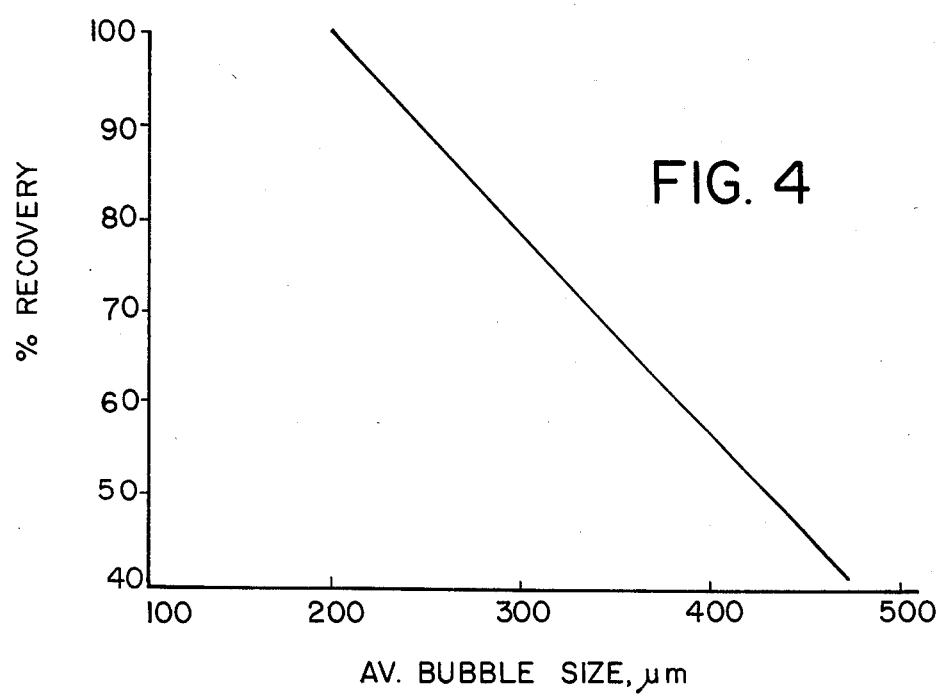

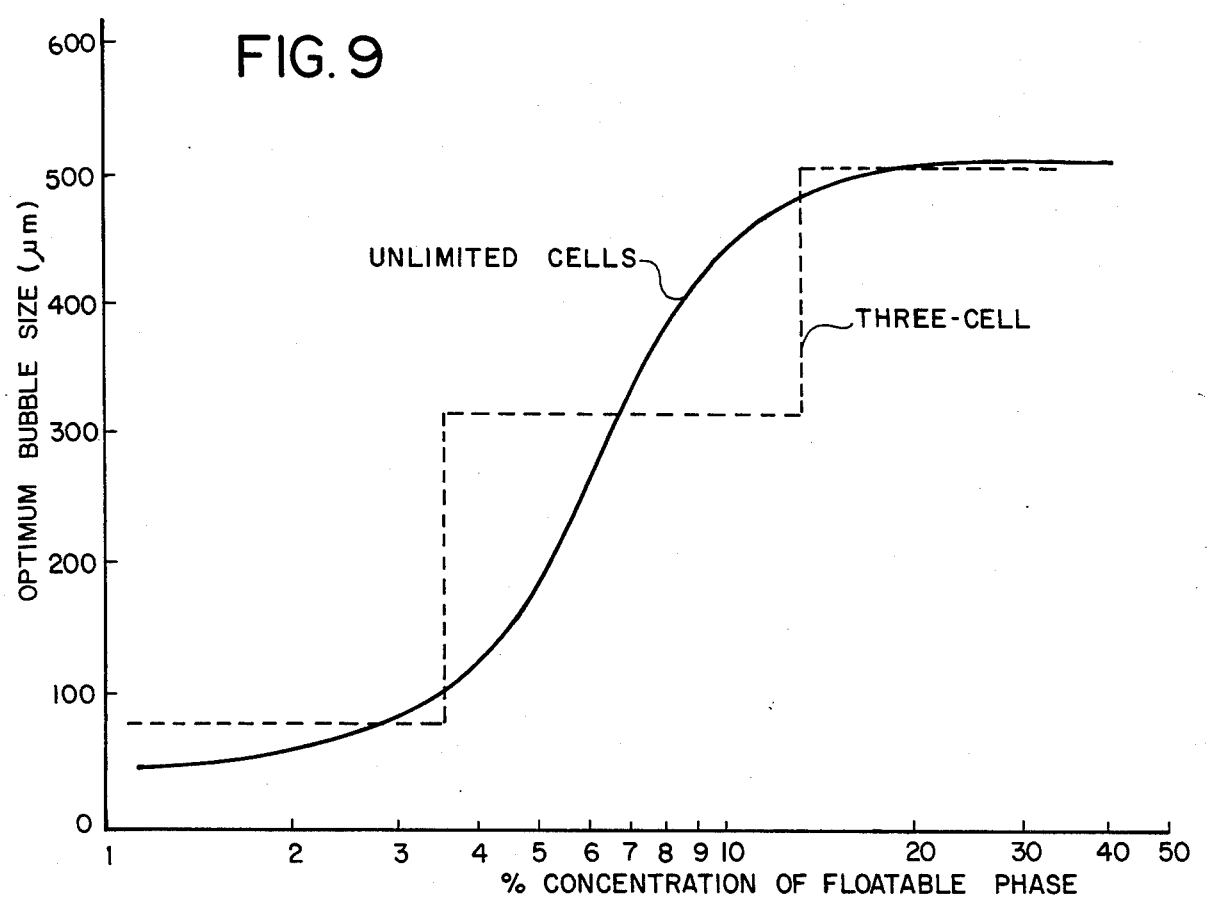
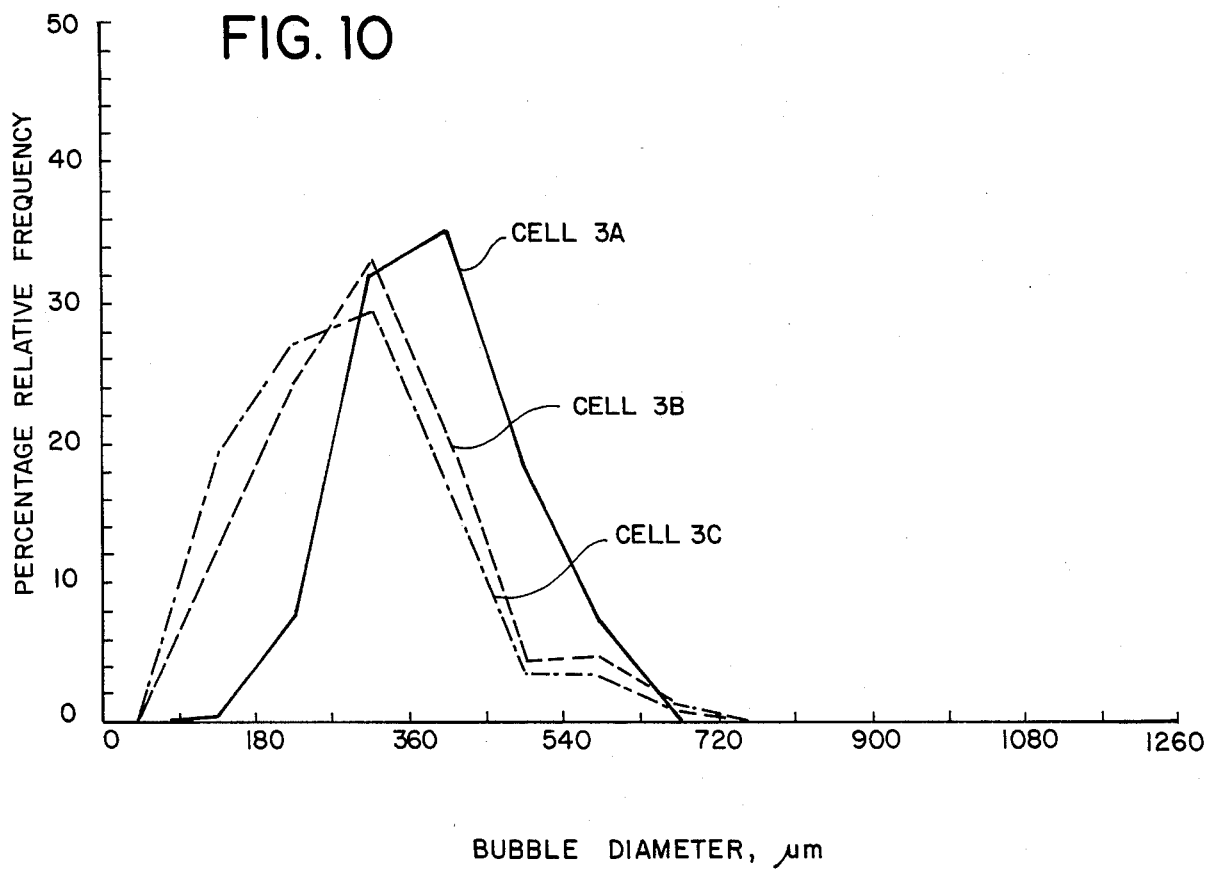

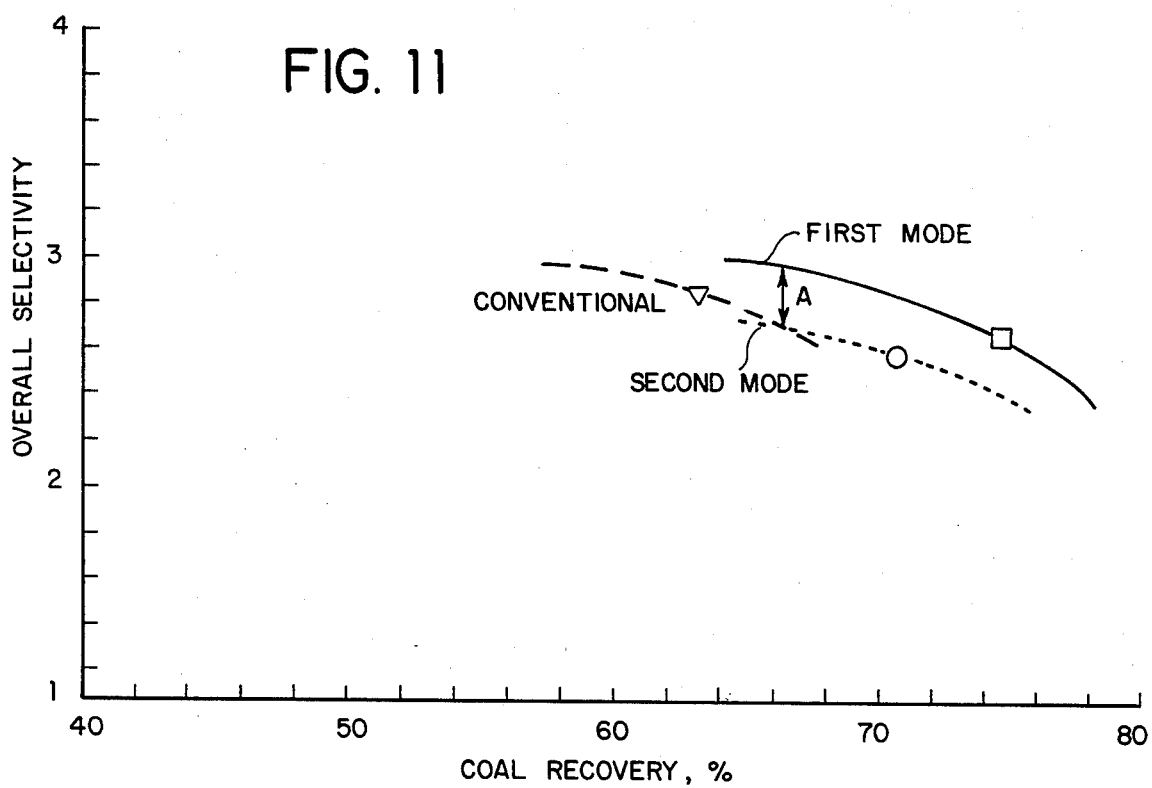
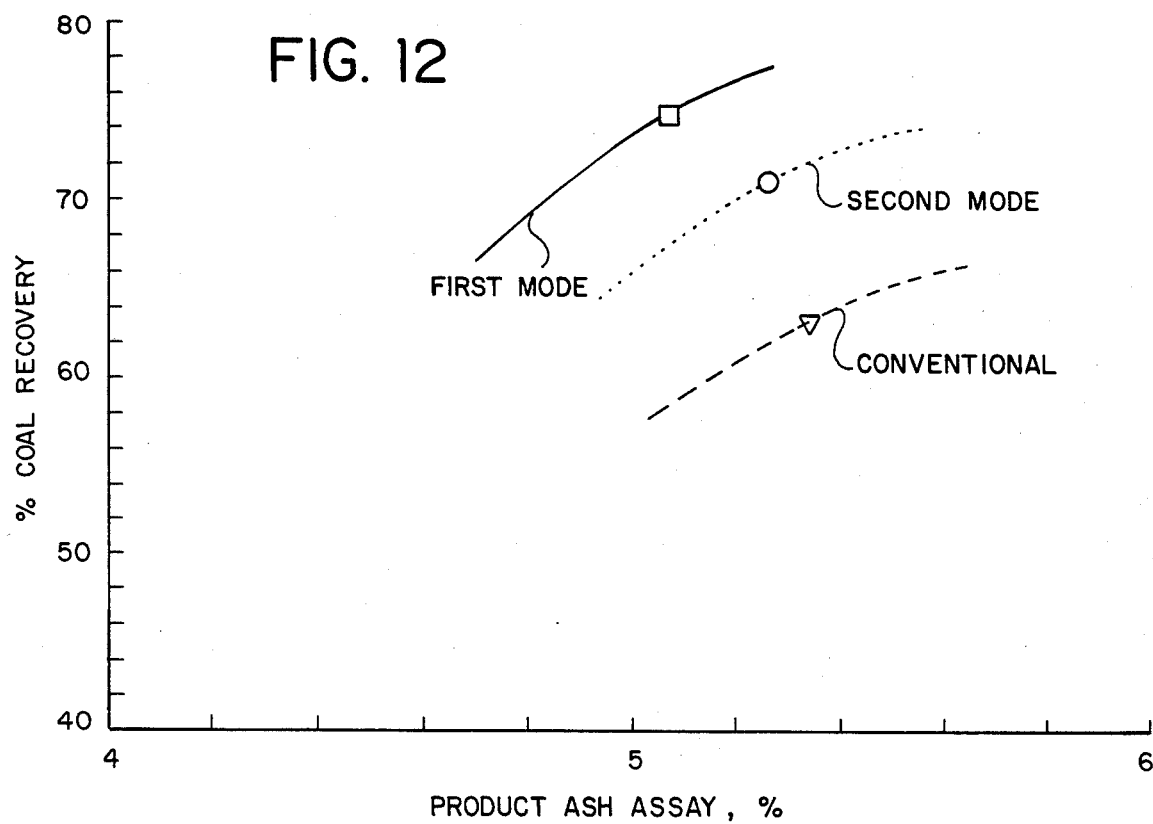

FROTH FLOTATION METHOD AND APPARATUS

BACKGROUND OF THE INVENTION

This invention relates to so-called froth flotation methods and apparatus in which air in the form of bubbles is delivered to a slurry or multi-phase fluid for causing separation by flotation of the flotable phase from the non-flotable phase in the slurry or fluid.

The froth flotation methods of this invention represent improvements over the conventional methods, such as those disclosed for example in U.S. Pat. Nos. 2,713,477 and 3,491,880, in which a quantity of slurry of particulate material having a flotable phase and a non-flotable phase is provided in a tank, air in the form of bubbles is delivered to and mixed with the slurry to form a froth comprising a mixture of air bubbles and the flotable phase from the slurry, the froth is withdrawn from the tank through an upper outlet port in the tank, and the nonflotable phase is withdrawn through a lower outlet port in the tank. These conventional froth flotation methods and apparatus for practicing them have been widely used for the separation of metallic and non-metallic minerals, and other industrial processes such as purification of food products, de-inking of paper pulp and treating industrial wastes. In some applications, the flotable phase of the slurry is the desired product and the non-flotable is a less desired by-product (and in some cases a waste by-product), and in other applications, the reverse is true.

The performance of the froth flotation apparatus in effecting separation of the flotable from the non-flotable phase of a slurry is measured by two factors; namely, rate and selectivity, which are generally inversely related to each other. The rate of separation is a measure of the quantity or mass of the froth of flotable phase removed from the slurry over a given period of time while selectivity is a measure of the quality of the froth removed. Rate is typically expressed as tons per hour, and selectivity is the ratio of the percent of flotable material in the froth to the percent of non-flotable material in the froth. As indicated previously rate and selectivity are inversely related so that increases in the rate of separation have the undesired but unavoidable affect of reducing the selectivity (or quality) of the removed material. In those applications in which the desired product is the flotable phase, increased rates have the unintended result of greater inclusion of the undesired non-flotable phase along with the desired flotable phase in the froth, which then requires additional downstream separation apparatus to achieve the desired froth purity. In those applications in which the desired product is the non-flotable phase, increased rates have the unintended result of removing a portion of the desired non-flotable phase along with the undesired flotable phase from the slurry, again requiring additional downstream separation apparatus to recover the "lost" desirable non-flotable material.

To date, attempts to maximize the rate and selectivity of froth removal in froth flotation machinery have been principally directed at providing a series of so-called froth flotation cells so arranged and sized relative to each other as to give the most cost effective balance between the degree of recovery of the desirable material, the purity of the separated products, and the increased capital and maintenance costs for the machinery. In such multi-cell machinery, the cells are connected in serial flow arrangement, each cell operating to remove a portion of the flotable phase at a predetermined rate and selectivity, and with each downstream cell thus receiving slurry for treatment at a lower concentration of the flotable phase than the cells upstream thereof. As shown for example in U.S. Pat. No. 3,491,880 improvements have also been made directed to increasing the volume of the air delivered to the slurry, the efficiency of the equipment for delivering the air, and the mixing action of the air bubbles in the slurry to form the froth. While machinery of this design has been generally satisfactory as evidenced by its wide usage in a number of industries, neither this froth flotation machine nor the other conventional machines embody a recognition of the physical phenomenon occurring between the air bubbles and the flotable phase for effecting its flotation as froth, much less a recognition of which factors may be controlled (and how to control such factors) to enhance the flotation phenomenon for increasing both the rate and the selectivity of the froth flotation.

SUMMARY OF THE INVENTION

Among the various objects of this invention may be noted the provision of a method of froth flotation which yields increased rates of separation together with increased selectivity; the provisions of such method which embodies a recognition of the physical phenomenon occurring between the air bubbles and the flotable phase for effecting flotation and provides control of the factors controlling this phenomenon for enhanced froth flotation; the provisions of such method in which air delivered to the slurry is controlled both so as to generate bubbles of a predetermined relatively small size and bubbles of a predetermined relatively large size, and to generate such small and large bubbles in respective predetermined volumes for enhanced flotation activity; the provision of such method in which the size and volume of air bubbles is controllable relative to the particle size of the flotable phase of the slurry, the concentration of the flotable phase in the slurry, or the chemical properties of the flotable phase for enhanced froth flotation not only in light of the nature of the slurry but also in light of the changing conditions of the slurry during the separation operations; the provision of a froth flotation method which yield improved separation of the flotable from the non-flotable phases of a multi-phase liquid (such as an oil-water emulsion); the provision of froth flotation apparatus for practicing the methods of this invention; the provision of such apparatus which may be embodied in either a single-cell or multi-cell machine.

In general, froth flotation apparatus of this invention for separating the flotable phase from the non-flotable phase of a slurry of particulate material comprises a tank having upper and lower ends, an inlet port for receiving slurry at a first concentration of the flotable phase, an upper outlet port for discharge of the flotable phase and a lower outlet port for discharge of the slurry at a second concentration of the flotable phase lower than the first concentration. The apparatus further comprises means for deliverying air to the slurry in the tank and means for mixing the slurry and the air to form a forth. The froth thus includes a mixture of air bubbles and flotable phase from the slurry, with the froth being flotable to the top of the slurry for discharge via the upper outlet port. The rate and selectivity of separation of the flotable phase from the slurry at a predetermined concentration of the flotable phase in the slurry is dependent on the volume and size distribution of the air bubbles generated in the slurry to form the froth. The air delivery means of this apparatus includes means for generating air bubbles of relatively large size, means for generating air bubbles of relatively small size, and means for regulating the volume of air supplied by said large and small bubble generation means, whereby the volume and size distribution of the air bubbles generated in the slurry may be controlled in response to the chemical properties of the flotable phase of the slurry, the particle size of the flotable phase, and the concentration of the flotable phase of the slurry so as to enhance separation of the flotable phase from the slurry.

In the single-cell embodiment of this apparatus, the inlet port is positioned between the upper and lower outlet ports and receives a generally continuous stream of slurry at the stated first concentration. In addition, the means for generating small bubbles and the means for generating large bubbles generate such bubbles at a point generally adjacent the inlet port. The froth of flotable phase and air bubbles float up from the vicinity of the inlet port to the upper outlet port, and the slurry as the flotable phase is removed therefrom flows down from the inlet port to the lower outlet port.

In the multi-cell embodiment of this apparatus, a plurality of flotation cells are provided, which are connected in serial flow arrangement, with each upstream cell separating a portion of the flotable phase from the slurry and discharging the slurry at a lower concentration of the flotable phase to a downstream cell. The means for generating small bubbles, the means for generating large bubbles and the means for regulating the volume of air supplied by said large and small bubble generating means are controlled in response to the concentration of the flotable phase of the slurry in this particular cell so as to enhance separation of the flotable phase.

In general, the method of this invention comprises the steps of providing a quantity of slurry in the tank, generating air bubbles of relatively small size in the slurry in the tank, generating air bubbles of relatively large size in the slurry, and controlling the volume of air as small bubbles and the volume of air as large bubbles in response to the concentration of the flotable phase of the slurry so as to generate the total volume and size distribution of air bubbles in the slurry for enhanced separation of the flotable phase from the slurry.

Another method of this invention effects separation of the flotable phase from the non-flotable phase of a multi-phase liquid. Both the single-cell and multi-cell embodiments of the apparatus of this invention are adapted to practice either of the above-noted methods of this invention.

Other objects and features of this invention will be in part apparent and in part pointed out hereinafter.

BRIEF DESCRIPTION OF THE DRAWINGS

FIG. 3 is a graphical representation of the selectivity of recovery of the flotable phase as a function of average bubble size for a predetermined flotation time and air flow rate;

FIG. 4 is a graphical representation of the percentage of recovery of the flotable phase in a slurry as a function of average bubble size generated in the slurry for a predetermined flotation time and air flow rate;

FIG. 9 is a graphical representation of the optimum bubble size as a function of concentration of flotable phase in a multi-cell froth flotation machine, the solid curved line representing the line of optimum bubble size for a machine of an unlimited number of cells and the dotted stepped line representing the optimum for a three-cell machine;

FIG. 10 is a graphical representation of the bubble size distribution generated for the first, second and third cells of a three-cell froth flotation machine of this invention;

FIG. 11 is a graphical representation of the selectivity of separation as a function of the percentage of recovery of the flotable material for the conventional three-cell froth flotation machine, this same machine but with an equal volume of fine bubbles added to each cell, and this same machine but with fine bubbles added in the manner shown in FIG. 10;

FIG. 12 is a graphical representation of recovery of flotable material as a function of percentage of non-flotable also removed for the three machines depicted in FIG. 11;

Corresponding reference characters indicate corresponding parts throughout the several views of the drawings.

DESCRIPTION OF THE PREFERRED EMBODIMENTS

Figure 1:
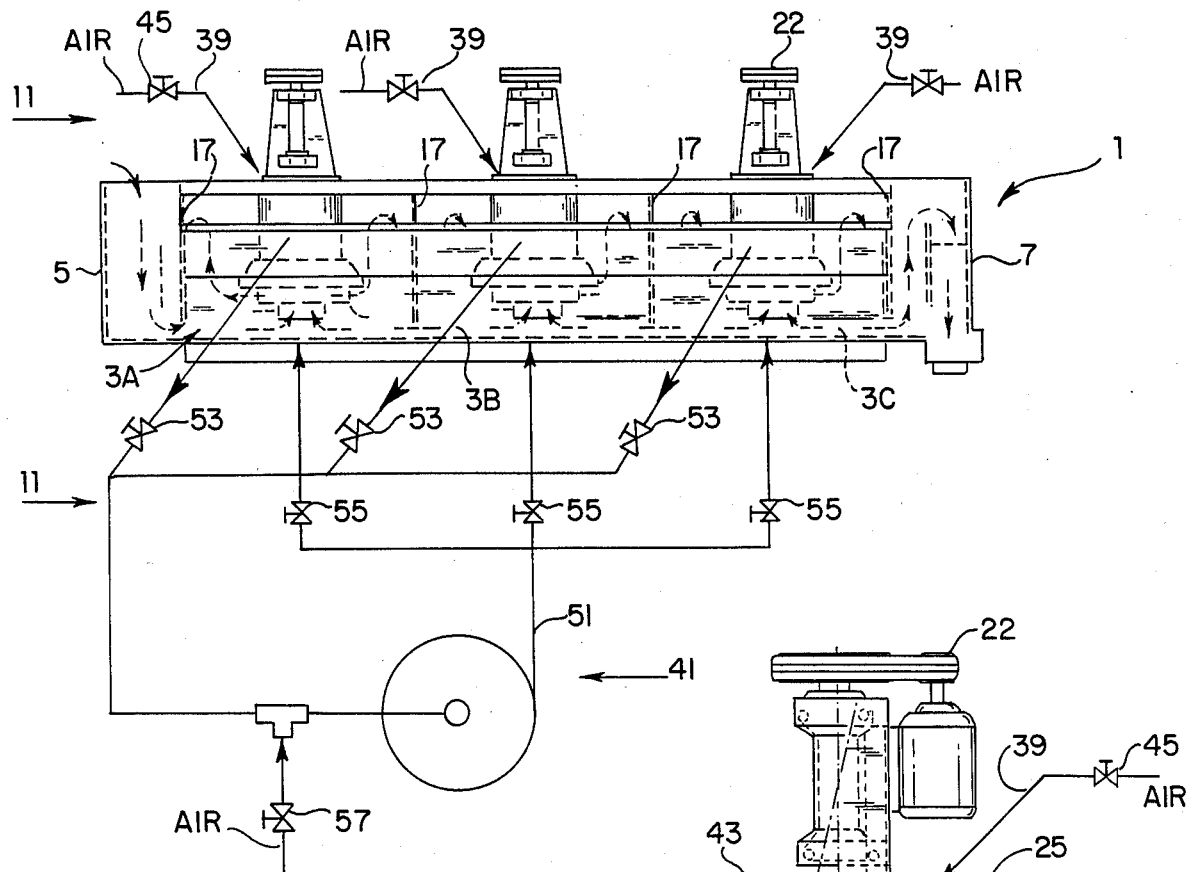
FIG. 1 is an elevation of a multi-cell embodiment of the froth flotation apparatus of this invention, shown in partial section.

Referring to FIG. 1, there is generally indicated at 1 a multi-cell embodiment of apparatus of this invention for separating the flotable phase from the non-flotable phase of a slurry or multi-phase liquid (such as an oil-water emulsion) by froth flotation. This apparatus, which is commonly referred to as a froth flotation machine, is used in processing metallic slurries such as iron ore, tin, lead, tungsten and non-metallic slurries such as coal, potash, sand and phosphate. The machine comprises a plurality of cells (e.g., three such cells 3A, 3B, 3C as illustrated) positioned in side-by-side relation and connected in serial flow arrangement. The upstream cell 3A receives the slurry to be separated via a feed box 5 and the downstream cell 3C discharges the processed slurry as so-called tails via a discharge box 7. At each cell, air is received for mixing as air bubbles with the slurry S to form a froth comprising the flotable phase of the slurry and the air bubbles, with this froth being removed at an overflow or weir 9 of the cell. In accordance with this invention, the air is delivered to the cells by air delivery means (generally indicated at 11 in FIG. 1) which controls the total volume and the size distribution of the air bubbles so as to enhance the separation of the flotable phase from the slurry.

Figure 2:
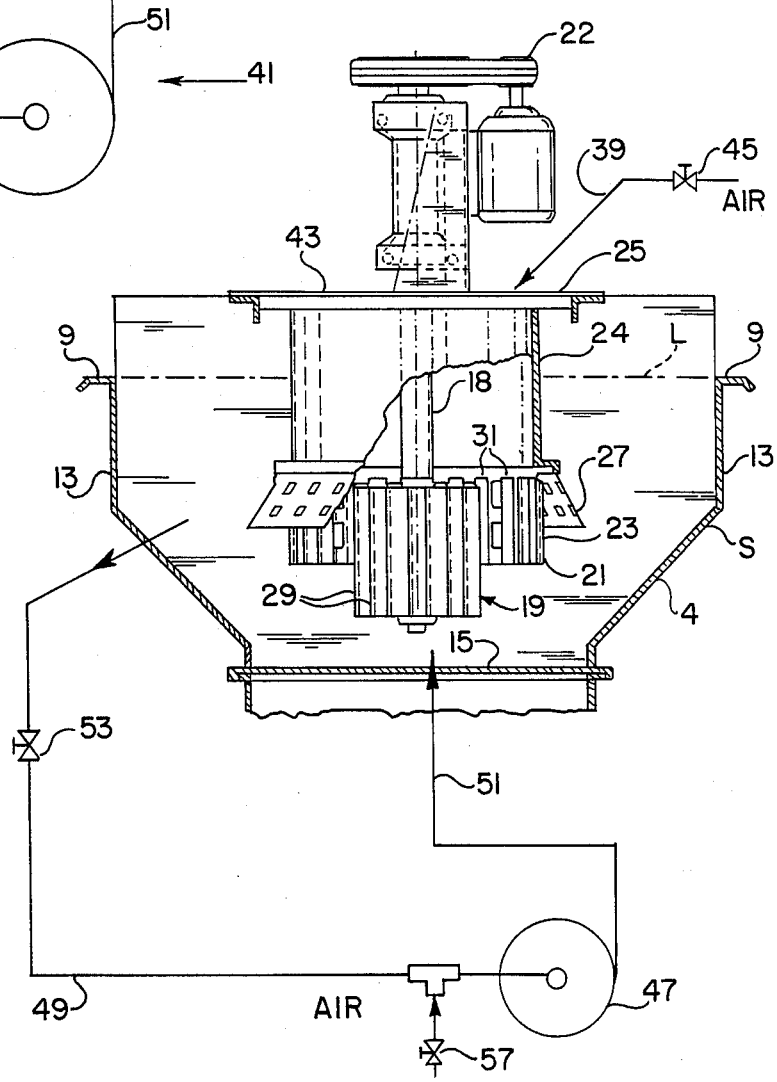
FIG. 2 is an enlarged transverse vertical section of one cell of the apparatus of FIG. 1.

Each cell 3 comprises a tank 4 formed by side and bottom walls (13 and 15 respectively in FIG. 2) and end walls 17 (as best shown in FIG. 2). The upstream cell 3A has an end wall 17 at the feed box 5 which is spaced from the bottom 15 to enable flow of slurry therefrom, and a common or partition end wall with middle cell 3B also spaced from the bottom to enable flow thereto. The downstream cell 3C has an end wall at the discharge box 7 so positioned to enable flow thereto, and a partition wall with middle cell to enable flow therefrom.

As best illustrated in FIG. 2, each cell includes a rotor 19 and a stator means 21. The rotor is fixed to the bottom of a shaft 18 and is supported a substantial distance above the bottom wall 15 of the tank for rotation about a vertical axis. The shaft is driven via a motor and a belt and pulley arrangement 22. A cross member mounted on a superstructure 25 above the tank carries the motor and the bearings supporting the shaft. The upper edges of the side walls of the tank include the overflow 9 which may be adjusted in vertical position to assist in maintaining the level of slurry S in the tank at a predetermined level L.

The lower portion of the stator 21 means comprises a perforated stator sleeve 23 surrounding and radially spaced from the rotor. The sleeve is mounted on the bottom of a imperforate standpipe 24 which in turn is suspended from the superstructure. The sleeve is of a length so as to extend vertically from a point at or above the top of the rotor 19 down to a point above the bottom of the rotor. The standpipe further serves as a conduit for the flow of air from above the liquid level L down to the vicinity of the rotor. The stator means further includes a generally frusto-conical perforated hood 27 surrounding the sleeve.

As described in detail in U.S. Pat. No. 3,491,880, the rotor 19 comprises a plurality of generally axially and radially extending vanes 29 having enlarged radial outer portions, and the stator sleeve includes a plurality of vertically extending ribs 31 at spaced locations around the inner peripheral surface of the sleeve. The rotor, when rotated in the stator sleeve, operates to draw the slurry S in the tank laterally along the bottom of the tank and then upwardly into the stator sleeve 23. At the same time, the rotor operates to draw air down the standpipe 24, and to force the air and slurry radially outwardly through the openings in the perforated stator sleeve 23. As the air and slurry flows through the openings in the sleeve, shear forces are created which causes the air to be broken into a mass of relatively large bubbles entrained in the slurry. This mixture flows outwardly from the sleeve into the tank. The flotable particulate material in the slurry tends to adhere to the air bubbles more readily than the non-flotable material does, thereby forming a froth of flotable material in major portion, non-flotable material in minor portion, and air bubbles. This froth floats towards the top of tank for removal at the overflow. The slurry, now with a lower concentration of flotable materials, is in part recirculated in the tank and is in part discharged to a downstream cell or the discharge box. To the extent described above, the machine 1 corresponds in certain of its features (most notably, the generation of large bullbes) to froth flotation machines commercially available under the trade designation Wemco 1+1 froth flotation machine.

In accordance with this invention, and as described in detail hereinafter, the machine 1 incorporates certain novel and unique features which embody for the first time a recognition of the physical phenomenon occurring between the air bubbles and the flotable phase for effecting froth flotation. More particularly, it has been found that by selectively controlling both the size distribution of the air bubbles delivered to the slurry to form the froth and the volume of air generated as bubbles, the rate and selectivity of froth flotation recovery can be significantly enhanced. This heretofore unrecognized relationship between the efficiency and effectiveness of froth flotation, and air bubble characters is best illustrated by FIGS. 3 and 4. FIG. 3 is a graphical representation of the selectivity of separation of coal particles from an aqueous slurry of flotable coal particles and non-flotable ash particles (and other undesired materials) as a function of average bubble size generated in the slurry for a predetermined time and air volume flow rate. As will be observed from FIG. 3, as the average bubble size is decreased from the largest size of approximately 500 $\mu$m, the selectivity of separation of the coal particles (i.e., the ratio of the percentage of coal particles in the froth to the percentage of ash particles in the froth) increases until a maximum or inflection point is reached where the selectivity is approximately 3.3 and the bubble size is 200 $\mu$m. Decreases in bubble size below 200 $\mu$m results in reduced selectivity of separation. Referring to FIG. 4, it will be observed that as the bubble size is decreased, the rate of separation of the coal particles from the slurry increases linearly, without reaching a maximum or inflection point on FIG. 4. Typically, such point is reached when the average size of the bubble approaches the average size of the particle, and thus an average air bubble is no longer able to float an average flotable particle. For the coal particles in the slurry depicted in the graph of FIG. 4, the smallest size of the air bubbles shown (i.e., 200 $\mu$m) had not yet approached the relatively small size of the coal particles.

Figures 5A, 5B, 5C:
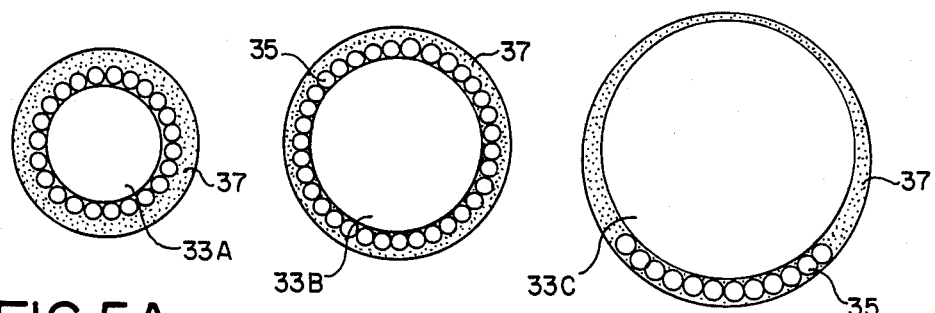
FIGS. 5A, 5B and 5C are schematics of three different sized bubbles with particles of the flotatable phase of the slurry adhered thereto and with non-flotatable material carried on the flotable material.

Several factors are believed to be involved in the above-noted relationship between bubble size and froth flotation rate and selectivity. Perhaps the primary factor involved (and factor best understood) is the change in the bubble geometrical dimensions of surface area and volume with bubble size. Air bubbles are typically spherical in shape. Thus the area of the surface of the bubble available for the adherence by flotable phase particles is a function of the square of the bubble diameter, whereas the volume of the bubble which determines the buoyant force available to carry the flotable particles is a function of the cube of the bubble diameter. As best illustrated in FIG. 5B, the greatest selectivity of separation for a predetermined concentration of flotable phase and predetermined particle size is achieved when the air bubbles 33 are made as large as possible consistent with their surfaces being fully covered by particles 35 of the flotable material as the air bubbles rise to the surface of the slurry. At noted above, particles 35 of the flotable phase exhibit a greater tendency to adhere or cling to the surface of air bubbles 33 than do the particles of the non-flotable phase 37; hence the name "flotable" even though none of the particles themselves float without the aid of air bubbles. The non-flotable phase typically exhibit a lower, but nonetheless measurable, tendency to adhere to the surface of the air bubbles of the flotable particles because of the physical-chemical properties or because of the presence of a slurry film attached to the bubble surface. Thus, any air bubble floats or carries not only flotable particles 35, but also a coating of the non-flotable phase 37 on the exposed surfaces of the flotable particles adhered to the air bubble, as well as, on the uncovered portion of the surface of the air bubble 33 itself.

For air bubbles larger than the optimum size (i.e., the large air bubble 33C in FIG. 5C), the air bubble has a relatively large volume to surface area ratio and thus the bubble rises relatively rapidly in the slurry.

It has been shown theoretically and experimentally that the efficiency of collection of flotable particles by air bubbles is given by the formula $Ec = a\, dp^m/Dp^n$; where a is a constant, dp and Dp are the diameters of particles and bubbles, respectively, and m and n are constants established experimentally. Under this formula, it will be observed that large bubbles have insufficient collection efficiency to provide complete surface coverage before the relatively rapidly rising large bubbles reach the surface of the slurry. However, the non-flotable phase 37 which is already carried on the flotable particles covers the loaded air bubble, not only on the exposed surfaces of the flotable particles but also on the surface of the uncovered portion of the air bubble. In comparing a bubble 33B of optimum size against a larger bubble 33C, it is found that the optimum sized bubble carries approximately the same quantity of the flotable phase to the surface of the slurry but presents a small surface area for the non-flotable phase. Thus, the ratio of flotable phase to non-flotable phase carried by the optimum sized bubble is greater than for the larger bubble.

For bubbles smaller than the optimum size (i.e., the small bubble 33A in FIG. 5A), these bubbles have a higher surface area to volume ratio than bubbles 33B of optimum size bubbles. Thus, while the surfaces of these small bubbles become fully covered with particles 35 of the flotable phase as they rise to the surface of the slurry, they also present a relatively large area to be covered by the non-flotable phase. Thus, the ratio of flotable phase to non-flotable phase carried by the optimum sized bubble is greater than for smaller bubbles.

As to the rate of separation produced by bubbles of various sizes for a given volume of air as shown in FIG. 4, the optimum sized bubble provides relatively high rates of separation. While smaller bubbles could perhaps yield higher rates of separation, such bubbles would also give resultant lower selectivity of separation (i.e., poorer quality of froth overflow). Thus, for purposes of this invention optimum bubble size is that yielding the greatest selectivity, while still providing greater rates of separation than heretofore possible with the relatively large bubbles generated by conventional froth flotation machines.

Figure 6:
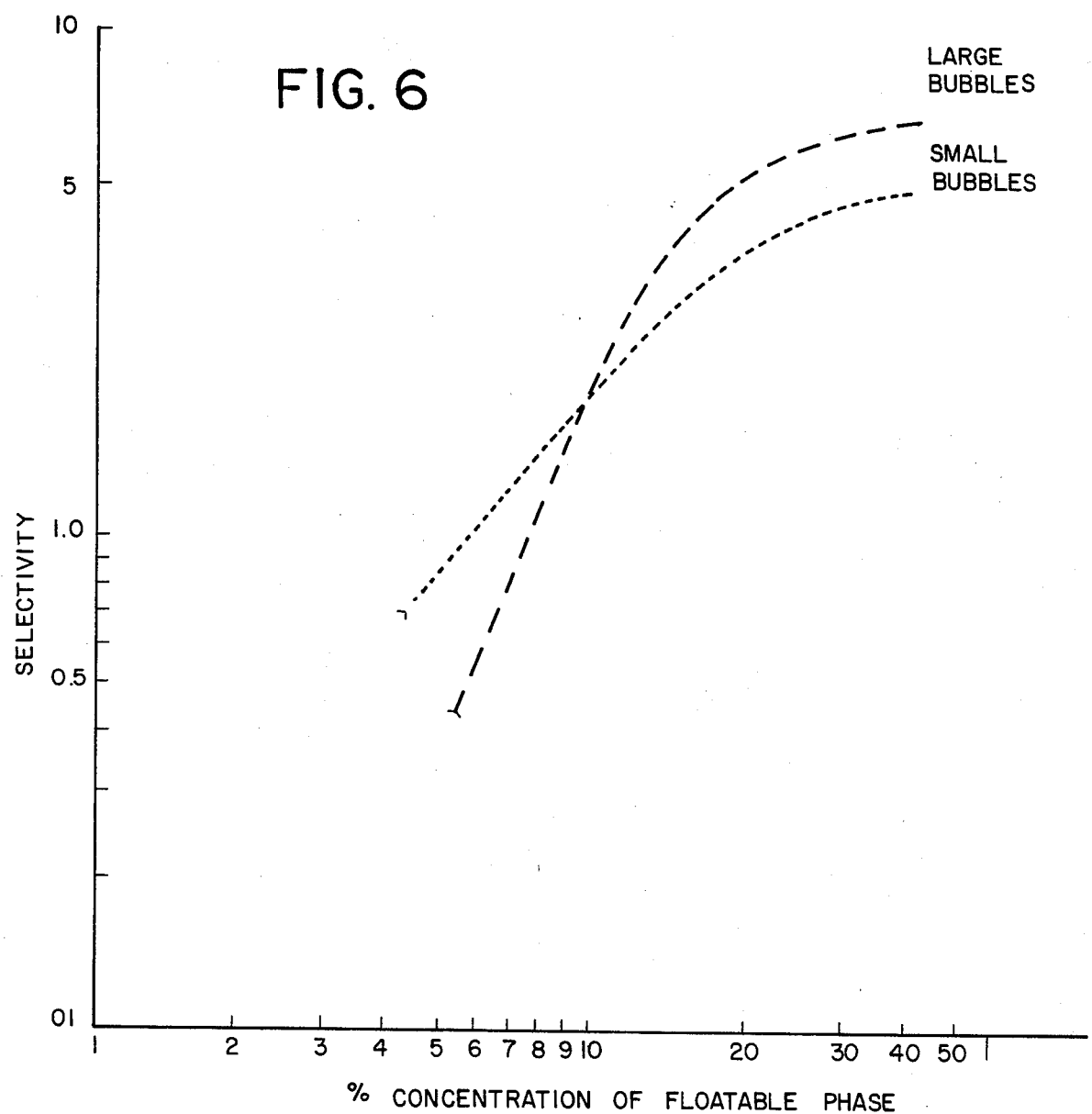
FIG. 6 is a graphical representation of the selectivity of separation as a function of the concentration of the flotable material in the slurry.

Referring to FIG. 6 there is graphically depicted another observed phenomenon of air bubble and flotable particle kinetics; namely that for a predetermined size flotable particles, selectivity of separation is a function of the concentration of the flotable phase in the slurry, as well as a function of bubble size. More particularly, large bubbles as depicted by the dashed line in FIG. 6 yields greater selectivity at higher concentrations but small bubbles depicted by a dotted line yields greater selectivity at low concentrations. This observation is wholly consistent with the phenomenon depicted in FIG. 5. In high concentration slurries, a relatively low collection efficiency is enough to provide full coverage of the surface of an air bubble with flotable phase particles and thus the optimum size bubble may be relatively large. However, in low concentration slurries, a higher collection efficiency is required to cover the surface of an air bubble and thus the optimum size bubble must be made smaller to enable the bubble to be fully covered by the flotable phase. It should be noted the rate and selectivity of separation are also functions of the size of the flotable particles and the chemical properties of the flotable phase.

Figure 7:
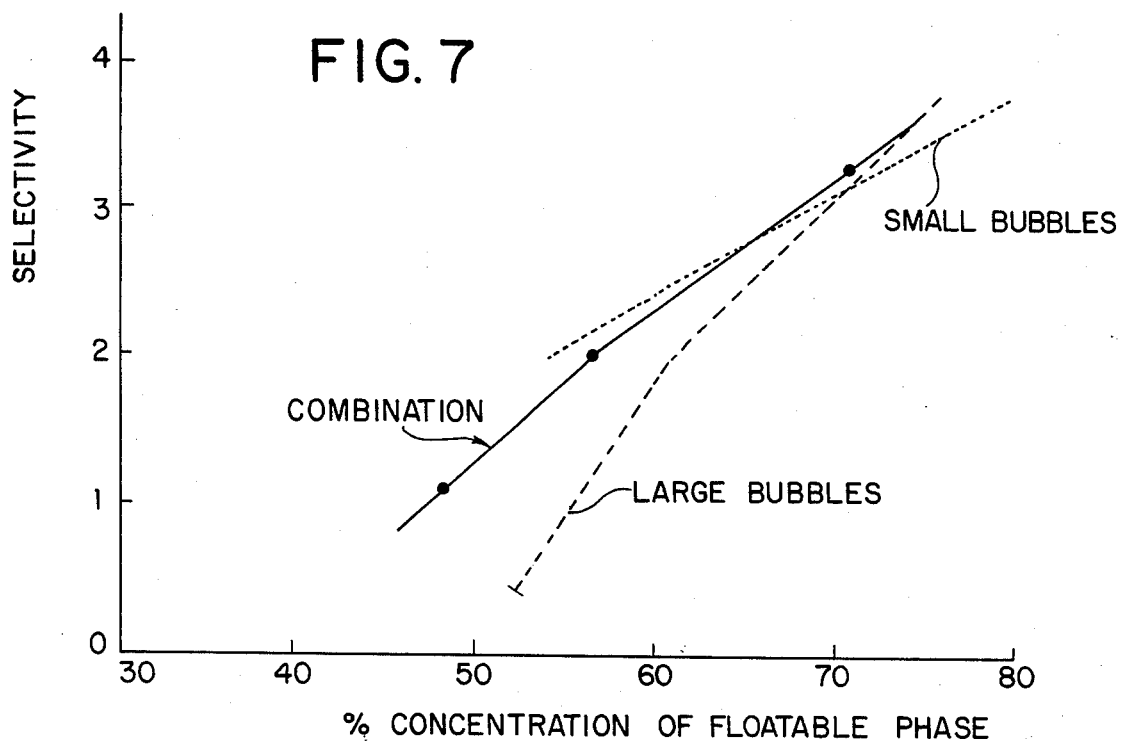
FIG. 7 is a graphical representation of the selectivity of separation as a function of the concentration of the flotable phase in the slurry for fine bubbles alone, large bubbles alone and the combination thereof.

Since during the course of operation of a cell 3 the froth flotation machine 1 flotable phase is continuously withdrawn from the slurry, the concentration of this phase is constantly changing (i.e., decreasing). In contrast, changing the bubble size distribution during the course of operation is difficult requiring sophisticated measurement and control apparatus. Typically bubble size is not controlled and thus remains constant throughout the operation of the cell. Thus, while initially in froth flotation operation use of larger air bubbles yields the greatest selectivity of separation, as the operation continues, smaller bubbles at some point yield greater selectivity. As best illustrated in FIG. 7, the preferred bubble size distribution for such a continuous operation froth flotation machine would be a combination of large and small air bubbles. For relatively high and relatively low concentration slurries, this combination of bubbles represented by the solid line yields a slightly lower selectivity than large and small bubbles represented by dashed and dotted lines respectively. Nonetheless, over the entire range of operation of the machine and particularly for the center of the range, the combination bubbles yield better overall selectivity than either small bubbles or large bubbles alone.

Figure 8:
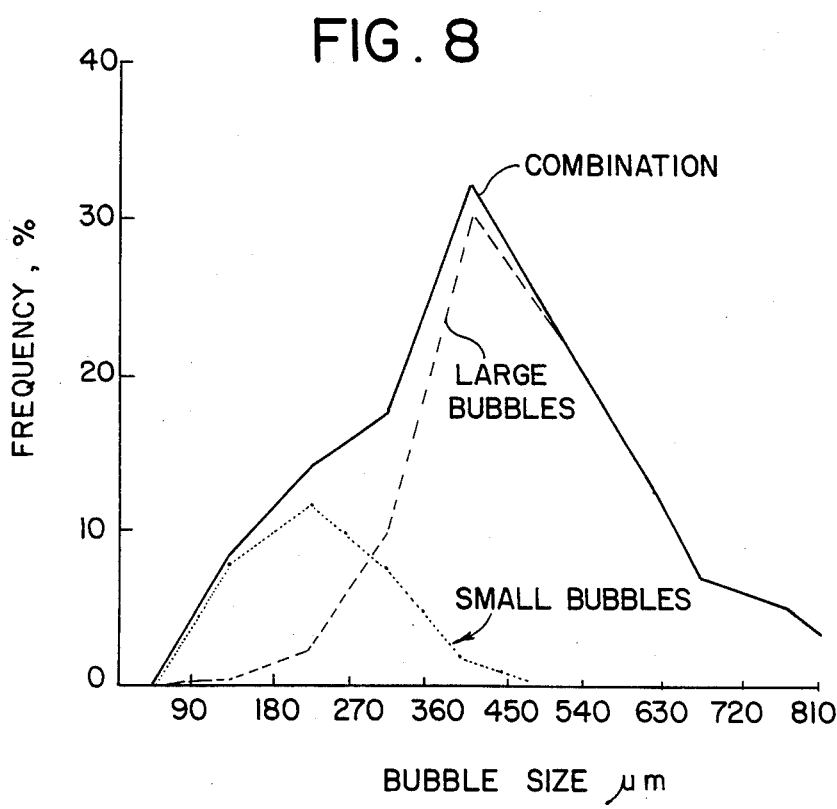
FIG. 8 is a graphical representation of the size distribution of bubbles generated by a large bubble generator, a small bubble generator, and the combined effect of these two machines.

The froth flotation machine of this invention, as described more fully hereinafter, incorporates air delivery means 11 generating such a combination of large and small bubbles for the highest overall selectivity of separation during the operation of the machine as flotable concentration decreases. Basically, this means 11 combines the outputs of a means 39 for generating large bubbles with the output of a means 41 for generating small bubbles. FIG. 8 is a graphical representation of the size distribution of the bubbles generated by a small bubble generator (represented by the dotted line), a large bubble generator (represented by the dashed lines) and the combination of these bubbles (represented by solid lines).

In addition to the above-described changes in concentration of flotable phase occurring during the course of froth flotation operations in a single tank or cell, each cell of the multi-cell froth flotation apparatus 1 typically holds slurry having a different concentration than the other cells of the machine. More particularly, the upstream cell 3A of the machine holds slurry having the highest concentration, while the downstream cell 3C holds slurry of the lowest concentration. Cells, such as cell 3B, intermediate the upstream and downstream cells hold slurry having some intermediate concentration of flotable material. Thus, the optimum size bubble for each cell holding slurry of a different concentration is also different. Referring to FIG. 9 there is graphically illustrated the optimum bubble size for a multi-cell froth flotation machine as a function of the concentration of the flotable phase. The solid curved line shows the optimum bubble size for a machine having an unlimited number of cells, in which the bubble size is set to be of the optimum size for the concentration of the slurry in each cell. The dashed line illustrates the preferred bubble size for each cell of a three cell froth flotation machine. For each of the three cells, particularly the intermediate cell, the preferred bubble size distribution set for the cell is approximately an average of the optimum bubble sizes for the entire range of operation of that cell.

Referring again to FIGS. 1 and 2, the froth flotation machine 1 of this invention includes the means 39 for generating large bubbles, the means 41 for generating small bubbles and means for controlling the volume of air as large bubbles and the volume of air as small bubbles for each cell of the machine. As previously described, the impeller 19 when rotated draws air down the standpipe 24 and expels the air together with slurry radially outwardly through the perforated sleeve 23 to form the froth having bubbles therein. These bubbles are relatively large (approximately 400 μm diameter and larger). Thus the impeller together with the standpipe and sleeve constitute the means 39 for generating relatively large bubbles of the machine. To control the volume of air as large bubbles, the top of the standpipe is closed by a cover 43 having vent piping and a valve 45 in the piping. By regulating the opening of the valve, the volume of air flowing to the impeller and thus formed as large bubbles may be controlled. The means 41 for generating small bubbles preferably comprises a suitable centrifugal pump 47, such as that commercially available under the trade designation WEMCO EL 1×1×5¼, connected in inlet piping 49 for receiving slurry from the cells of the machine and air from a source thereof (not shown), and in outlet piping 51 for discharging a mixture of slurry and fine bubbles. It has been found that the shearing action created at the tip of the blades of a pump rotor when rotated at high speed (e.g., 3500 RPM) causes air delivered to the hub of the rotor to be formed into a multitude of fine bubbles (approximately 250 μm diameter and smaller). Valves 53 in each branch of the inlet piping enables control of the volume of slurry withdrawn for each respective cell, and valves 55 in each branch of the outlet piping enables control of the volume of slurry with fine bubbles entrained therein to be delivered to each respective cell. A valve 57 in the air supply line controls the total volume of air formed as small bubbles.

In the operation of the froth flotation machine 1 for separating a slurry of particulate matter, for example separating flotable coal particles from a slurry of coal and ash particles, one particularly successful mode of operation of the machine is to provide only large bubbles from the impeller for the upstream cell 3A, large bubbles from the impeller together with one-third of the output of small bubbles from the centrifugal pump for the middle cell 38, and large bubbles together with two-thirds of the output of small bubbles for the downstream cell 3C. The volume of air as small and large bubbles was controlled so that the total volume of small bubbles was at least 3% of the total volume of large bubbles. The size distribution of bubbles for the three cells is illustrated in FIG. 10. The solid line represents the large bubbles only for the upstream cell, the dashed line represents the large and one-third small bubbles for the middle cell, and the dashed and dotted line represents the large and two-thirds small bubbles for the downstream cell. A second but somewhat less successful mode of operation of the machine is to generate large bubbles and provide one-third of the small bubbles to each cell. Thus each cell would have the same combination of large and small bubbles; namely, the size distribution represented by the dashed line in FIG. 10.

A series of tests on coal slurries was conducted to determine the effect on froth flotation selectivity and rate of separation due to operation of the machine in the conventional mode (i.e., with only large bubbles) and the above-noted first mode and second modes. In these tests, the slurry was prepared from Utah coal wet ground in a ball mill to a solids concentration of approximately 46%. As fed to the machine, the solids concentration was approximately 11%. Ash concentration in the slurry was approximately 12.5%. The size distribution of the coal particles was as follows:

| Size Fraction (mesh) | % |
| --- | --- |
| +14 | 1.96 |
| 14 to 28 | 6.99 |
| 28 to 65 | 31.62 |
| 65 to 200 | 30.98 |
| −200 | 28.45 |

The air flow to the impeller 19 of the machine 1 was set to be approximately 100 standard cubic feet per hour (SCFH) per cell, with the impeller generating air bubbles of approximately 356 um average diameter. The centrifugal pump had an air flow rate of approximately 22 SCFH and generated bubbles having an average diameter of approximately 200 μm. In accordance with this invention, the average diameter of the bubbles of relatively small size is thus no greater than two-thirds the size of the average diameter of the bubbles of relatively large size. To facilitate the formation of bubbles a suitable frothing reagent, such as MIBC (methylisobutylcarbonal) was added to the slurry in a concentration of approximately 28 μl per liter of the feed slurry. A conventional flotation agent such as fuel oil was also added to the slurry to enhance the flotation of the coal particles. The concentration of fule oil used was approximately 500 gram per metric ton of coal processed. The machine was run for approximately 60 minutes in each mode of operation, with eight to ten different samples being taken at generally equal time intervals during this period of operation in each mode.

The results of these tests are shown in FIGS. 11 and 12. FIG. 11 is a graphical representation of the selectivity of separation as a function of the percentage of coal in the slurry recovered in the froth. The dashed line represents an average volume measured for the operation of the machine in the conventional mode, with the triangle representing the mean of the samples taken for that mode. The dotted line represents the above-noted second mode of operation (i.e., the three cells each receiving ⅓ of the small bubbles), with the circle representing the mean of the samples. The solid line represents the first mode of operation (i.e., no small bubbles, ⅓ and ⅔), with the square representing the mean. As will be observed from FIG. 11, the machine when operated in accordance with this invention in either the first or second modes gave a higher percentage of coal recovery than in the conventional mode of operation. Moreover, in the first mode of operation (i.e., 0, ⅓, ⅔) the selectivity of separation was significantly higher than in the conventional mode for a predetermined coal recovery as illustrated by the dimension A in FIG. 11. In FIG. 12, the modes of operation are represented by the same types of line construction as in FIG. 11. FIG. 12 is a graphical representation of the percentage of coal recovery as a function of the undesired ash also recovered in the froth. As will be observed from FIG. 12, the machine when operated in either the first or second modes gave a significantly higher percentage of coal recovery for any attendant recovery of ash than did the machine in the conventional mode, with the first mode giving higher recovery than the second. Conversely, for any predetermined percentage of coal recovery, the amount of attendant ash recovery is significantly less for the first and second modes of operation of this invention than for the conventional mode.

Figure 13A:
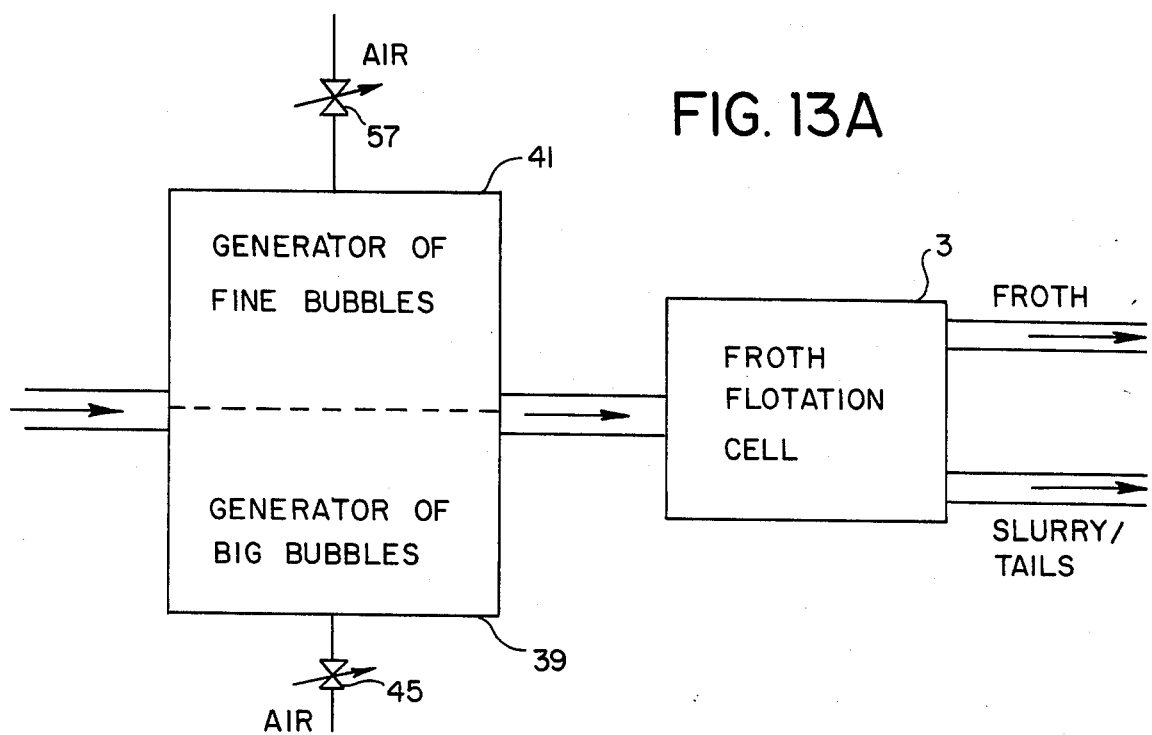
FIGS. 13A and 13B are schematics of alternative manners of generating combined large and small bubbles.
Figure 13B:
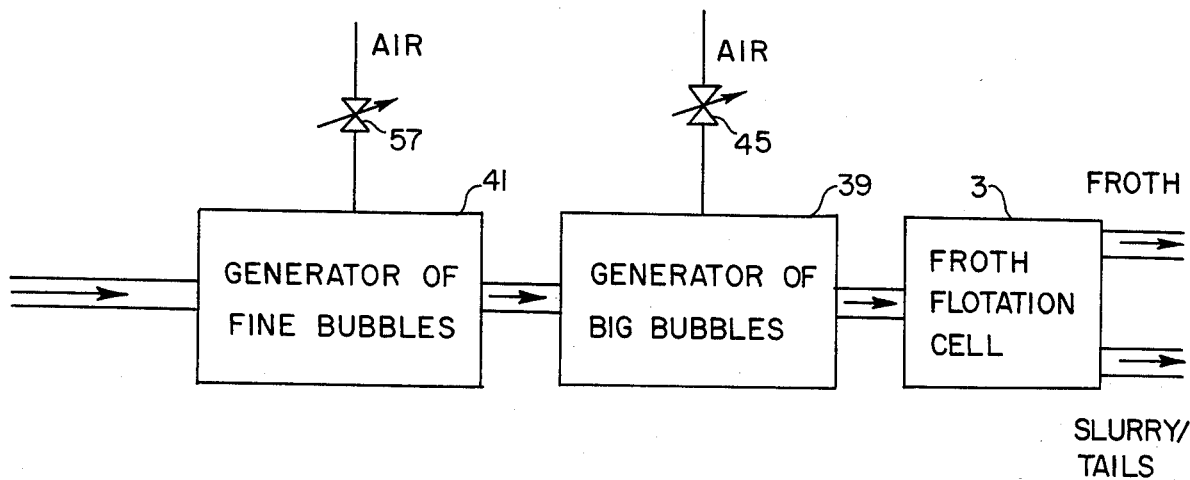
Figure 14:
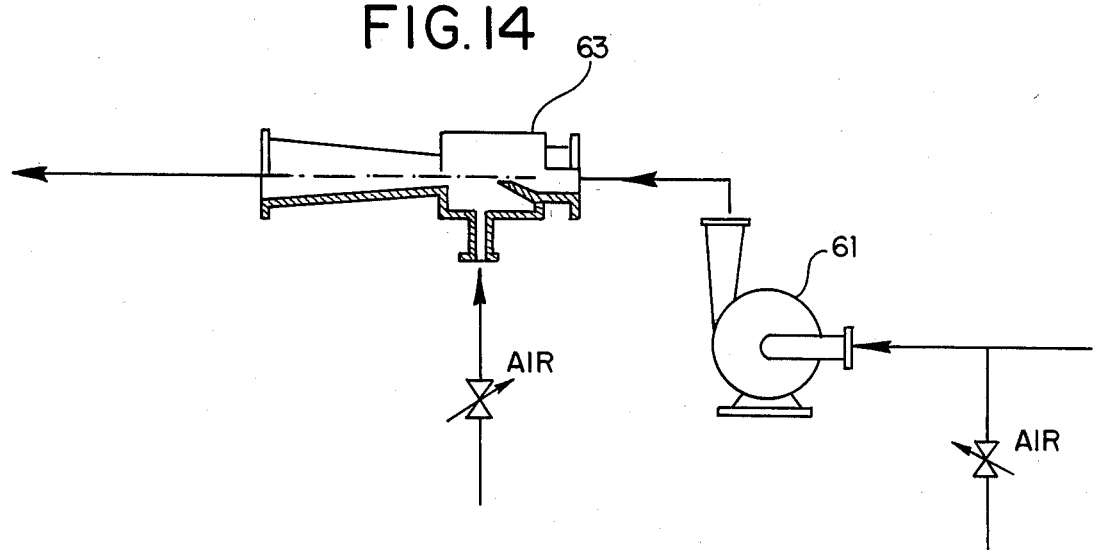
FIG. 14 is a schematic of an alternative construction for a fine bubble generator.

The small and large bubble generation means 39, 41 are schematically represented in FIG. 13A. As will be observed from this Figure, these means are arranged in parallel and each produces its respective bubbles for the froth flotation operation independently of the other. This parallel arrangement is particularly well suited for use with froth flotation machines of the self-induced air flow type such as previously described and shown in FIGS. 1 and 2. Another and alternative arrangement of these means is shown in FIG. 13B. In this arrangement, the small and large bubble generation means are connected in series, which may be preferred for froth flotation machines of the forced air type such as shown for example in U.S. Pat. No 2,713,477. FIG. 14 illustrates one possible air delivery means comprising a small bubble generator, such as a centrifugal pump 61, connected in series with a large bubble generator, such as an eductor 63. The output of the large bubble generator is connected to the tank of a froth flotation machine (not shown) for delivery of a combination of small and large bubbles to the slurry in the tank.

In addition to varying the points at which the small bubbles may be delivered to a froth flotation machine, the points at which the frothing reagent are delivered may also be varied. Tests in which the frothing reagent was added to the feed box 5 and alternatively to the fine bubble generator 41 were conducted in conjunction with the above-noted tests relating to bubble size. It was found that at least for the self-induced type froth flotation machine, such as machine 1, the delivery of the frothing reagent to the inlet of the fine bubble generator 41 produced significantly smaller bubbles than when the same amount of the frothing reagent was added to the feed box 5. In particular when the frothing reagent (i.e., MIBC in a concentration of 14 $\mu$l/l of feed slurry) was introduced at the small bubble generator, the average overall bubble diameter was found in a series of tests to be approximately 27% smaller than the average overall diameter of the bubbles generated when the frothing reagent was added at the feed box. This result is believed to be due to the presence of a higher concentration of the frothing reagent in the slurry at the point of small bubble generation, thereby facilitating the formation of such bubbles. When the reagent is introduced directly to the small bubble generator, the reagent is at its highest concentration. When added to feed box, however, the reagent is allowed to become diluted in the slurry before reaching the small bubble generator. This discovery regarding the point of introduction may enable the use of less reagent or the use of small bubble generation means of less capacity than otherwise possible.

Figure 15:
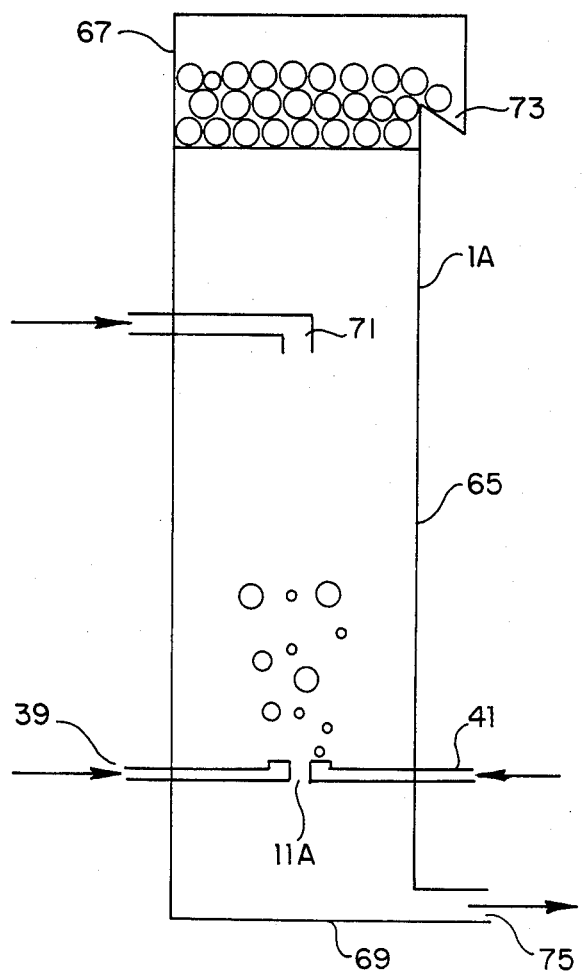
FIG. 15 is a single-cell embodiment of the apparatus of this invention in which the slurry and the bubbles are introduced generally centrally in the cell.

While the machine 1 depicted in FIGS. 1 and 2 and described above is of multi-cell (e.g., three cell) construction, it is contemplated that the method of this invention could be practiced in machines of any number of cells, including one cell. FIG. 15 illustrates a single-cell embodiment 1A of the apparatus of this invention. This embodiment includes a vessel comprising an upstanding tank 65 having upper and lower ends 67, 69 and an inlet port 71 positioned generally centrally between the ends for receiving a generally continuous stream of slurry at a first and relatively high concentration of flotable material. The vessel further has an upper outlet port 73 for discharge of the froth having particles of flotable material and air bubbles, and a lower outlet 75 port for discharge of the slurry at a second and lower concentration of the flotable phase (i.e., as so-called tails). The means 11A for delivery of air is located between the inlet and the outlet port 75. As described above and as best illustrated in FIGS. 13A and 13B, the air delivery means includes means 41 for generating small bubbles, means 39 for generating large bubbles, and means for controlling the volume of air generated as bubbles by the bubble generator. When air of the predetermined volume and in the form of bubbles of the predetermined size is delivered and mixed with the slurry, the froth flows up from the vicinity of the inlet to the upper outlet for discharge. At the same time, the slurry with a portion of its flotable phase removed in part flows down to the lower outlet for discharge. As indicated, the vessel receives a continuous flow of slurry at its inlet 71, and thus froth and processed slurry are continuously removed from the outlets 73, 75.

While the above description of the methods and apparatus of this invention has been directed to the froth flotation separation of slurries, it is to be understood that all of the above-noted methods and apparatus could be utilized as well in the separation of multi-phase liquids, such as oil-water emulsions, having a flotable phase and a non-flotable phase. Moreover, while the equipment used to generate the bubbles has been shown and described as including centrifugal pumps 47, 61 and eductor 63, other known bubble generation equipment is also contemplated.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. A froth flotation machine for improved separation of the flotable phase from the non-flotable phase of a slurry of particulate material,
    said machine comprising a plurality of flotation cells connected in a serial flow arrangement, with each upstream cell separating a portion of the flotable phase from the slurry and discharging the slurry at a lower concentration of the flotable phase to a downstream cell;
    each cell comprising a tank for holding the slurry, with the tank having an inlet port for receiving the slurry, an upper outlet port for discharge of the flotable phase, and a lower outlet port for discharge of the slurry;

means for delivering air to the slurry in the tank for each cell;

means for mixing the slurry and the air to form a froth, comprising a mixture of air bubbles and flotable phase from the slurry, the froth being flotable to the top of the slurry for discharge via the upper outlet port, with the rate and selectivity of separation of the flotable phase in the froth from the slurry for predetermined size particles of the flotable phase at a predetermined concentration of the flotable phase being dependent on the total volume and size distribution of the air bubbles generated in the slurry to form the froth; and said air delivery means for at lease one of said cells comprising means for generating air bubbles of relatively small size, means for generating air bubbles of relatively large size and means for regulating the volume of air supplied by said large and small bubble generation means, whereby the total volume and the size distribution of the air bubbles generated in the slurry in said one cell may be controlled in response to the concentration of the flotable phase of the slurry in the cell so as to enhance separation of the flotable phase from the slurry.

2. A machine as set forth in claim 1 wherein the average diameter of said bubbles of relatively small size is no greater than two-thirds the size of the average diameter of said bubbles of relatively large size.

3. A machine as set forth in claim 1 wherein said bubbles of relatively large size have an average diameter of at least approximately 400 μm.

4. A machine as set forth in claim 1 wherein said bubbles of relatively small size have an average diameter of less than approximately 250 μm.

5. A machine as set forth in claim 1 wherein said means for generating air bubbles of relatively small size comprises a centrifugal pump.

6. A machine as set forth in claim 1 wherein said means for generating air bubbles of relatively large size comprises an eductor.

7. A machine as set forth in claim 1 wherein at least two cells of said machine have said large and small bubble generation means, with the bubble generation means of at least one upstream cell producing bubbles of at least one cell downstream thereof.

8. A machine as set forth in claim 1 wherein at least three cells of said machine have said large and small bubble generation means, with the bubble generation means of each cell producing bubbles of a larger overall average diameter than the generation means of each of the cells downstream thereof.

9. A machine as set forth in claim 1 further comprising means for delivering frothing reagent to said one of said cells.

10. A machine as set forth in claim 9 wherein the frothing reagent delivery means is connected in flow communication with the small bubble generating means, with the reagent flowing to the tank via said generating means.

11. A method for improved separation of the flotable phase from the non-flotable phase of a slurry of particulate material in a froth flotation machine, said machine comprising a tank adapted to hold a quantity of slurry and having an upper outlet port for discharge of the flotable phase, and means for delivering air to the slurry in the tank to form a froth comprising a mixture of air bubbles and flotable phase from the slurry, the froth being flotable to the top of the slurry for discharge via the outlet port, with the rate of and selectivity of separation of the flotable phase from the slurry for predetermined size particles of the flotable phase and at a predetermined concentration of the flotable phase being dependent on the total volume and size distribution of the air bubbles generated in the slurry to form the froth; said method comprising the steps of (A) providing a quantity of slurry in the tank;

(B) generating air bubbles of relatively small size in the slurry in the tank;

(C) generating air bubbles of relatively large size in the slurry in the tank; and (D) controlling the volume of air as small bubbles and the volume of air as large bubbles in response to the concentration of the flotable phase of the slurry so as to generate the total volume and size distribution of air bubbles in the slurry for enhanced separation of the flotable phase from the slurry.

12. The method of claim 11 wherein the average diameter of said bubbles of relatively small size is no greater than two-thirds the size of the average diameter of said bubbles of relatively large size.

13. The method of claim 11 wherein said bubbles of relatively large size have an average diameter of at least approximately 400 μm.

14. The method of claim 11 wherein said bubbles of relatively small size have an average diameter of less than approximately 250 μm.

15. The method of claim 11 wherein the average overall diameter of the bubbles generated in the slurry is decreased as the concentration of the flotable phase in the slurry decreases during the separation process in the froth flotation machine.

16. The method of claim 11 wherein said froth flotation machine comprises a series of tanks in serial flow arrangement, air bubbles are generated in the slurry of each of said tanks, and wherein the overall average diameter of the bubbles generated in the slurry in these tanks decreases from the largest diameter for the first tank in the series to the smallest diameter for the last tank in the series.

17. The method of claim 11 further comprising controlling the volume of air as small bubbles and the volume of air as large bubbles in response to the average size of the particles of the flotable phase in the slurry, with the average overall diameter of the bubbles generated in the slurry being decreased as the average size of the particles in said slurry provided to said tank is decreased.

18. The method of claim 11 further comprising the step of delivering frothing reagent to the slurry in the tank.

19. The method of claim 18 wherein the frothing reagent is supplied to the means for delivering air to the slurry in the tank, and thus flows along with the air to the tank.

20. A froth flotation machine for improved separation of the flotable phase from non-flotable phase of a multiphase liquid, phase of a multi-phase liquid, said machine comprising a plurality of flotation cells connected in a serial flow arraqngement, with each upstream cell separating a portion of the flotable phase from the liquid and discharging the liquid at a lower concentration of the flotable phase to a downstream cell;

each cell comprising a tank for holding the liquid, with the tank having an inlet port for receiving the liquid, an upper outlet port for discharge of the flotable phase, and a lower outlet port for discharge of the liquid;

means for delivering air to the multi-phase liquid in the tank for each cell;

means for mixing the liquid and the air to form a froth, comprising a mixture of air bubbles and flotable phase from the liquid, the froth being flotable to the top of the liquid via the discharge via the upper outlet port, with the rate and selectivity of separation of the flotable phase in the froth from the liquid for predetermined size droplets of the flotable phase and at a predetermined concentration of the flotable phase being dependent on the total volume and size distribution of the air bubbles generated in the liquid to form the froth; and said air delivery means for at least one of said cells comprising means for generating air bubbles of relatively small size, means for generating air bubbles of relatively large size and means for regulating the volume of air supplied by said large and small bubble generation means, whereby the total volume and the size distribution of the air bubbles generated in the liquid in said one cell may be controlled in response to the concentration of the flotable phase of the liquid in the cell so as to enhance separation of the flotable phase from the liquid.

21. A machine as set forth in claim 20 wherein the average diameter of said bubbles of relatively small size is no greater than two-thirds the size of the average diameter of said bubbles of relatively large size.

22. A machine as set forth in claim 20 wherein said bubbles of relatively large size have an average diameter of at least approximately 400 $\mu$m.

23. A machine as set forth in claim 20 wherein said bubbles of relatively small size have an average diameter of less than approximately 250 $\mu$m.

24. A machine as set forth in claim 20 wherein said means for generating air bubbles of relatively small size comprises a centrifugal pump.

25. A machine as set forth in claim 20 wherein said means for generating air bubbles of relatively large size comprises an eductor.

26. A machine as set forth in claim 20 wherein at least two cells of said machine have said large and small bubble generation means, with the bubble generation means of at least one upstream cell producing bubbles of a larger overall average diameter than the generation means of at least one cell downstream thereof.

27. A machine as set forth in claim 26 wherein at least three cells of said machine have said large and small bubble generation means, with the bubble generation means of each cell producing bubbles of a larger overall average diameter than the generation means of each of the cells downstream thereof.

28. A machine as set forth in claim 20 further comprising means for delivering frothing reagent to said one of said cells.

29. A machine as set forth in claim 28 wherein the frothing reagent delivery means is connected in flow communication with the small bubble generating means, with the reagent flowing to the tank via said generating means.

30. A method for improved separation of the flotable phase from the non-flotable phase of a multi-phase liquid in a froth flotation machine, said machine comprising a tank adapted to hold a quantity of liquid and having an upper outlet port for discharge of the flotable phase, and means for delivering air to the liquid in the tank to form a froth comprising a mixture of air bubbles and flotable phase from the liquid, the froth being flotable to the top of the liquid for discharge via the outlet port, with the rate and selectivity of separation of the flotable phase from the liquid for predetermined size droplets of the flotable phase in the liquid and at a predetermined concentration of the flotable phase being dependent on the total volume and size distribution of the air bubbles generated in the liquid to form the froth; said method comprising the steps of (A) providing a quantity of liquid in the tank;
(B) generating air bubbles of relatively small size in the liquid in the tank;
(C) generating air bubbles of relatively large size in the liquid in the tank; and
(D) controlling the volume of air as small bubbles and the volume of air as large bubbles in response to the concentration of the flotable phase of the fluid so as to generate the total volume and size distribution air bubbles in the liquid for enhanced separation of the flotable phase from the liquid.

31. The method of claim 30 wherein the average diameter of said bubbles of relatively small size is no greater than two-thirds the size of the average diameter of said bubbles of relatively large size.

32. The method of claim 30 wherein said bubbles of relatively large size have an average diameter of at least approximately 400 $\mu$m.

33. The method of claim 30 wherein said bubbles of relatively small size have an average diameter of less than approximately 250 $\mu$m.

34. The method of claim 30 wherein the average overall diameter of the bubbles generated in the liquid is decreased as the concentration of the flotable phase in the liquid decreased during the separation process in the froth flotation machine.

35. The method of claim 30 wherein said froth flotation machine comprises a series of tanks in serial flow arrangement and wherein the overall average diameter of the bubbles generated in the liquid in these tanks decreases from the largest diameter for the first tank in the series to the smallest diameter for the last tank in the series.

36. The method of claim 30 further comprising controlling the volume of air as small bubbles and the volume of air as large bubbles, with the average overall diameter of the bubbles generated in the liquid being decreased as the average size of the droplets of flotable phase in said fluid provided to said tank is decreased.

37. The method of claim 30 further comprising the step of delivering frothing reagent to the fluid in the tank.

38. The method of claim 37 wherein the frothing reagent is supplied to the means for delivering air to the fluid in the tank and thus flows along with the air to the tank.

39. A froth flotation vessel for improved separation of the flotable phase from the non-flotable phase of a slurry of particulate material, said vessel comprising a tank having upper and lower ends, an inlet port for receiving a generally continuous stream of slurry at a first concentration of the flotable phase between the upper and lower ends of the tank, an upper outlet port for discharge of the flotable phase and a lower outlet port for discharge of the slurry at a second concentration of the flotable phase lower than said first concentration;

means for delivering air to the slurry in the tank; and means for mixing the slurry and the air to form a froth, including a mixture of air bubbles and flotable phase from the slurry, the froth being flotable to the top of the slurry for discharge via the upper outlet port, with the rate and selectivity of separation of the flotable phase in the froth from the slurry at a predetermined concentration of the flotable phase and for predetermined size particles of the flotable phase in the slurry being dependent on the total volume and size distribution of the air bubbles generated in the slurry to form the froth, and with the slurry as the flotable phase is removed therefrom tending to flow down from the inlet port to the lower outlet port; and said air delivery means comprising means for generating air bubbles of relatively large size in the slurry, means for generating air bubbles of relatively small size in the slurry, and means for regulating the volume of air supplied by said large and small bubble generation means, whereby the total volume and the size distribution of the air bubbles generated in the slurry may be controlled in response to the concentration of the flotable phase of the slurry so as to enhance separation of the flotable phase from the slurry.

40. A vessel as set forth in claim 39 further comprising means for delivering frothing reagent to said tank.

41. A vessel as set forth in claim 40 wherein the frothing reagent delivery means is connected in flow communication with the small bubble generating means, with the reagent flowing to the tank via said generating means.

42. A froth flotation vessel for improved separation of the flotable phase from the non-flotable phase of a multi-phase liquid;

said vessel comprising a tank having upper and lower ends, an inlet port for receiving a generally continuous stream of liquid at a first concentration of the flotable phase between the upper and lower ends of the tank, an upper outlet port for discharge of the flotable phase and a lower outlet port for discharge of the liquid at a second concentration of the flotable phase lower than said first concentration;

means for delivering air to the liquid in the tank; and means for mixing the fluid and the air to form a froth, including a mixture of air bubbles and flotable phase from the liquid, the froth being flotable to the top of the liquid for discharge via the upper outlet port, with the rate and selectivity of separation of the flotable phase in the froth from the liquid at a predetermined concentration of the flotable phase and for a predetermined size droplets of the flotable phase in the liquid being dependent on the total volume and size distribution of the air bubbles generated in the liquid to form the froth, and with the fluid as the flotable phase is removed therefrom tending to flow down from the inlet port to the lower outlet port; and said air delivery means comprising means for generating air bubbles of relatively large size in the liquid, means for generating air bubbles of relatively small size in the liquid, and means for regulating the volume of air supplied by said large and small bubble generation means, whereby the total volume and the size distribution of the air bubbles generated in the liquid may be controlled in response to the concentration of the flotable phase of the liquid so as to enhance separation of the flotable phase from the liquid.

43. A vessel as set forth in claim 42 further comprising means for delivering frothing reagent to said tank.

44. A vessel as set forth in claim 43 wherein the frothing reagent delivery means is connected in flow communication with the small bubble generating means, with the reagent flowing to the tank via said generating means.

* * * * *